Dec. 19, 1961 P. S. FAY 3,013,502
PERISTALTIC PUMPING DEVICE
Filed May 13, 1960
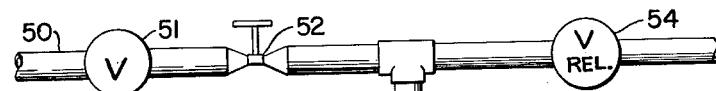
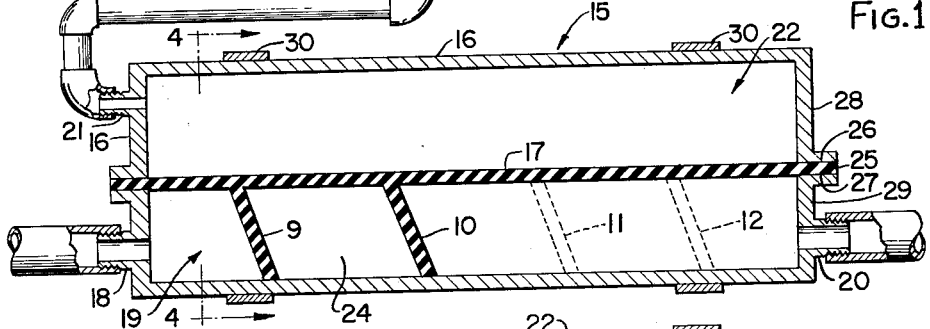
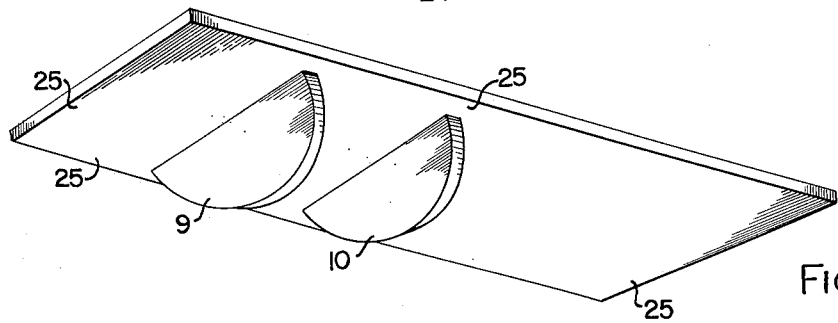
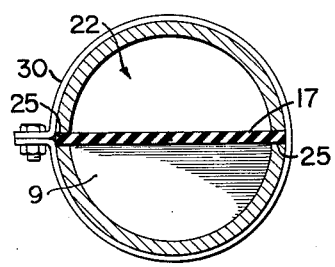
INVENTOR
PHILIP S. FAY
BY
Leland L. Chapman
ATTORNEY

United States Patent Office 3,013,502
Patented Dec. 19, 1961

3,013,502
PERISTALTIC PUMPING DEVICE
Philip S. Fay, Lyndhurst, Ohio, assignor to The Standard Oil Company, Cleveland, Ohio, a corporation of Ohio
Filed May 13, 1960, Ser. No. 28,957
6 Claims. (Cl. 103—152)

My invention relates to a pumping device and system whereby fluid material may be moved by a peristaltic pumping action.

The pumping device comprises a compound tube means including a rigid outer wall structure and a resilient dividing septum which divides the space within the outer wall structure into a pressure chamber and a flow chamber. Flap valve means are provided in the flow chamber to control flow when the septum is moved by deformation into and out of said flow chamber.

In a preferred embodiment, a downstream flap means and an upstream flap means are operatively associated with the tube means in a manner whereby the downstream flap means is opened and the upstream flap means is closed upon movement of the septum by deformation into the trap chamber and vice versa. In this fashion, the volume of the trap chamber can be varied and, by means of the flap valve means, flow of the fluid may be controlled to cause movement in the desired direction through the flow chamber. Preferably, the septum has flap valves formed therewith as an integrated unit of a suitable material having the required resilience for the septum and flexibility for the flap valves. Also, it is preferred that the flap valves slope from the septum downstream into sealing contact with inner wall surface of the flow chamber, the downstream slanting attitude of the flap valve means causing the fluid to be pumped in the desired downstream direction. Suitable means described hereinafter can be employed to produce the cyclic pressure fluctuations in the pressure chamber.

The peristaltic pump of my invention may be molded of light-weight, inexpensive plastic material and requires no complicated steps in fabrication. The complete pump may be made of corrosion-resistant material for use in handling corrosive substances, thus avoiding expensive liners, special housings and the like. The pump is easily installed and may be powered in numerous fashions such as by electricity, internal combustion engines, and fluid power with no electrical power for control. Examples of fluid power are hydrostatic heads of fluid such as water falls, compressed gas, pressured pipelines and the like. In the use of fluid power, the danger of explosion in hazardous situations can be eliminated as no electrical power is required. Further, no bulky power source is required.

From the standpoint of maintenance and durability, my invention has no moving mechanical parts which require special lubrication. The sealing perimeters of the flap valves will wear somewhat due to contact with the inner wall of the flow chamber and the material being pumped but the fluids will provide lubrication and the slanted flap valves can be made long enough to allow reasonable wear of the sealing perimeters without destroying their sealing capability.

No complicated valving or fine passages are required. Therefore, my invention can be used to handle all types of fluids such as slurries, gels, suspensions and the like, as well as simple fluids.

In situations where there is a single feed conventional pump at a central pumphouse, operating over a pressure cycle rather than at a steady pressure, the feed stream to a unit could power and actuate my pump to pump the product stream away from the unit.

Other important objects and advantageous features of the invention will be apparent from the following description and accompanying drawings, wherein, for the purposes of illustration herein, a specific embodiment of this invention is set forth in detail, and wherein:

FIGURE 1 is an elevational view of a complete system showing my pump in section with certain flap valves shown in phantom;

FIGURE 2 is a sectional view of my pump of FIGURE 1 with the septum deformed into the flow chamber;

FIGURE 3 is a perspective view of the septum having flap valves formed integral therewith; and FIGURE 4 is an end view taken on line 4—4 of FIGURE 1.

Referring now to FIGURE 1, it will be seen that my invention comprises a compound tube means generally indicated by numeral 15. The compound tube means 15 includes a rigid outer wall structure 16, a resilient dividing septum 17, an upstream inlet 18 for flow into flow chamber 19, a downstream outlet 20 for flow out of the flow chamber 19, and a pressure fitting 21 in fluid communication with the pressure chamber 22. The cross-sectional shape of the chambers 19 and 22 may be of any suitable design and their relative volumes will vary in accordance with the desired operational requirements.

Operatively associated with the compound tube means 15 are flap valve means 9 and 10. Preferably, the flap valve means 9 and 10 are mounted in the compound tube means 15 for movement in a manner to allow flow of fluid downstream from trap chamber 24 past flap valve 10 as the septum 17 is deformed into the trap chamber 24 and to cause flow of fluid past flap valve means 9 downstream into the trap chamber 24 as the septum is allowed to resume its normal undeformed condition. In this manner, fluid is forced downstream during the deformation movement of the septum 17 and fluid is sucked into the trap chamber 24 when the septum is allowed to assume its normal position.

It will be understood that a plurality of flap valves such as 11 and 12 shown in phantom may be employed resulting in the formation of a plurality of trap chambers. Also, it will be understood that the opening and closing action of the flap valves may be accommodated in various manners. In the preferred embodiment, the flap valve means 9 and 10 are integrally formed with the septum 17 which is a part of the compound tube means 15. Preferably, the flap valves are flexible and slant downstream into sealing engagement with the inside surface or inner wall of the flow chamber 19. The peripheral edge of each flap valve therefore conforms to the entire wall of the flow chamber at its area of contact therewith to form the required seal. It will be noted in FIGURE 3 that the septum 17 is a rectangular resilient member, the peripheral border 25 of which provides a sealing gasket. The sealing gasket border 25 is positioned between the two ring-like flat sealing surfaces 26, 27 of the pressure portion 28 and flow portion 29, respectively, of the rigid outer wall structure 16 and is clamped into sealing engagement therewith by suitable clamping means 30.

Suitable means are provided for producing the cyclic pressure fluctuations in the pressure chamber 22 to cause deformation of the septum 17. The embodiment shown in FIGURE 1 is a preferred embodiment for use with a system wherein power is obtained from a pressured fluid, either gas or liquid. Pressured fluid in conduit 50 passes through stop valve 51 to an adjustable needle valve 52 which allows the fluid to bleed at a predetermined controlled rate through conduit 53, pressure fitting 21 to pressure chamber 22. Relief valve 54 remains closed until a predetermined pressure is built up in pressure chamber 22 sufficient to cause the pumping deformation of septum 17 into the flow chamber 19. When the predetermined pressure is attained, relief valve 54 opens and exhausts fluid from line 50 and pressure chamber 22 thereby allowing septum 17 to return to its normal position. Stop valve 51 enables the removal of the pump from service. The needle valve 52 insures the same pumping rate when the pump is re-energized.

Other power-control systems for the pump include the use of a solenoid operated valve controlled by mechanical or electrical timers in various combinations to accomplish the controlled cyclic pressure variations A controlled piston could be used to produce the pressure required.

In operation, as pressure in pressure chamber 22 is increased, the septum 17 is distorted (FIGURE 2), decreasing the volume in trap chamber 24 and causing flap valves 10 to open and allow downstream flow. After sufficient pressure has built up to open relief valve 54, the pressure in pressure chamber 22 is reduced and septum 17 returns to its undistorted position (FIGURE 1), producing a partial vacuum in trap chamber 24, causing flap valve 9 to be drawn open and drawing new fluid into trap chamber 24.

Various modifications of this invention will be apparent to those skilled in the art, and, for that reason, I wish to limit myself only within the scope of the appended claims.

I claim:

1. A pumping device for fluids comprising a compound tube means including a rigid outer wall structure and a resilient dividing septum defining a pressure chamber and a flow chamber in said wall structure, said flow chamber having an inside surface, an upstream inlet and a downstream outlet in said wall structure in fluid communication with said flow chamber, at least two flexible flap valve means spacedly mounted on said septum in said flow chamber defining the upstream end and the downstream end of a trap chamber in said flow chamber, each flexible flap valve means slanting from said septum toward the downstream outlet and having a peripheral edge substantially conforming to the inside surface of said flow chamber at the area of contact therewith to form a seal, said septum providing a deformable wall for said trap chamber, the downstream and upstream flap valve means being operatively associated with said tube means to cause the downstream flap valve means to be opened and the upstream flap valve means to be closed upon movement of said septum into said trap chamber, and vice versa.

2. A pumping device in accordance with claim 1 and wherein said rigid wall structure comprises a pressure portion and a flow portion having ring-like opposed sealing surfaces and wherein said septum includes a sealing gasket border positioned between said surfaces.

3. A pumping device in accordance with claim 2 and wherein said flap valve means are integral with and extend from said septum.

4. A pumping device in accordance with claim 3 and including means for producing cyclic pressure fluctuations in said pressure chamber comprising a conduit for a fluid under pressure connected to said pressure chamber, means for slowly bleeding pressure from said conduit to said chamber, and means for releasing pressure from said chamber upon reaching a predetermined pressure.

5. A pumping device for fluids comprising a compound tube means including a rigid outer wall structure and a resilient dividing septum defining a pressure chamber and a flow chamber in said wall structure, said flow chamber having an inside surface, an upstream inlet and a downstream outlet in said wall structure in fluid communication with said flow chamber, at least two flexible flap valve means spacedly mounted on said septum in said flow chamber defining the upstream end and the downwstream end of a trap chamber in said flow chamber, each flexible flap valve means having a peripheral edge substantially conforming to the inside surface of said flow chamber at the area of contact therewith to form a seal, said septum providing a deformable wall for said trap chamber, the downstream and upstream flap valve means being operatively associated with said tube means to cause the downstream flap valve means to be opened and the upstream flap valve means to be closed upon movement of said septum into said trap chamber, and vice versa.

6. A pumping device in accordance with claim 5 and wherein said rigid wall structure comprises a pressure portion and a flow portion having ring-like opposed sealing surfaces and wherein said septum includes a sealing gasket border positioned between said surfaces.

References Cited in the file of this patent

UNITED STATES PATENTS 2,918,219    MacCracken _____ Dec. 22, 1959

FOREIGN PATENTS 465,246    Canada _____ May 23, 1950